(12) United States Patent
Yanagisawa

(10) Patent No.: US 7,073,911 B2
(45) Date of Patent: Jul. 11, 2006

(54) PROJECTOR WITH IMPROVED HEAT RADIATION

(75) Inventor: Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 191 days.

(21) Appl. No.: 10/798,446

(22) Filed: Mar. 12, 2004

(65) Prior Publication Data
US 2004/0239886 A1 Dec. 2, 2004

(30) Foreign Application Priority Data
Mar. 14, 2003 (JP) ............................. 2003-070541

(51) Int. Cl.
- G03B 21/18 (2006.01)
- G03B 21/26 (2006.01)
- G03B 21/28 (2006.01)
- G02F 1/1335 (2006.01)
- G02B 27/10 (2006.01)

(52) U.S. Cl. ............................ 353/56; 353/31; 353/33; 353/60; 353/81; 349/9; 349/58; 359/627

(58) Field of Classification Search ................. 353/20, 353/31, 33, 52, 55, 57, 58, 60, 119, 81, 56; 349/9, 58; 359/246, 249, 259, 627, 634, 359/496, 497, 499, 500, 501; 352/202; 355/30
See application file for complete search history.

(56) References Cited

U.S. PATENT DOCUMENTS

| | | | | |
|---|---|---|---|---|
| 6,375,328 B1 * | 4/2002 | Hashizume et al. | .......... | 353/30 |
| 6,473,150 B1 * | 10/2002 | Takushima et al. | ......... | 349/161 |
| 6,619,800 B1 * | 9/2003 | Takezawa et al. | ............ | 353/20 |
| 6,619,803 B1 * | 9/2003 | Notagashira | .................. | 353/31 |
| 6,623,129 B1 * | 9/2003 | Fujimori | ..................... | 353/122 |
| 6,639,743 B1 * | 10/2003 | Watanabe | .................... | 359/820 |
| 6,811,262 B1 * | 11/2004 | Takezawa et al. | ............ | 353/20 |
| 6,877,858 B1 * | 4/2005 | Notagashira | ................. | 353/20 |
| 6,882,480 B1 * | 4/2005 | Yanagisawa | ................. | 359/634 |

FOREIGN PATENT DOCUMENTS

| JP | 2002-214585 A | 7/2002 |
|---|---|---|
| JP | 2002-229121 | 8/2002 |
| JP | 2003-075798 A | 3/2003 |

* cited by examiner

Primary Examiner—Melissa Jan Koval
(74) Attorney, Agent, or Firm—Oliff & Berridge, PLC

(57) ABSTRACT

An optical apparatus includes a color synthesizing prism, a plurality of exit-side polarizer plates which are respectively arranged on the light entrance side faces of the color synthesizing prism through entrance-side heat conduction plates, a plurality of liquid-crystal display devices which are respectively arranged on the entrance sides of the plurality of exit-side polarizer plates, and a plurality of entrance-side polarizer plates which are respectively arranged on the entrance sides of the plurality of liquid-crystal display devices. The entrance-side heat conduction plate which is located in the optical path of colored light generating the largest quantity of heat can be arranged in heat insulation from the entrance-side heat conduction plates which are located in the optical paths of the other colored lights, and it can be joined to an armoring case through heat conduction members.

7 Claims, 6 Drawing Sheets

PROJECTOR WITH IMPROVED HEAT RADIATION

BACKGROUND OF THE INVENTION

1. Field of Invention

An aspect of the invention relates to a projector having a plurality of optical modulation devices which modulate each of a plurality of individual color lights in accordance with image information, respectively, and a plurality of light-beam entrance end faces in opposition to which the respective optical modulation devices are arranged. The respective color lights modulated by the corresponding optical modulation devices can be synthesized so as to emit the synthesized light.

2. Description of Related Art

FIG. 6 is a sectional view showing an optical apparatus. As shown in FIG. 6, a liquid-crystal display device 10 (only one liquid-crystal display device is shown) includes a liquid crystal panel 12 and a panel holding frame 14, and it is attached to the corresponding one of the plurality of light entrance side faces of a color synthesizing prism (color synthesizing optical device) 16 through metal pins 18. An exit-side polarizer plate 20 can be mounted on the light entrance side face of the color synthesizing prism 16.

The liquid-crystal display device 12 has two glass substrates 12A, 12B which oppose to each other through a liquid crystal layer (not shown). A dust-proof glass 22 is arranged on the exit side face of the glass substrate 12A, and a dust-proof glass 24 on the entrance side face of the glass substrate 12B. Besides, a flexible circuit board 26 for wiring is connected to the glass substrate 12A.

The panel holding frame 14 has two frame members 14A, 14B which are made of a metal material, and it is constructed so as to hold the liquid crystal panel 12 (and dust-proof glasses 22, 24) therein.

Regarding the structure of such an optical apparatus, a method wherein liquid crystal panels are attached to a prism unit through columnar spacers of good thermal conductivity is described, for example, in JP-A-2002-229121 (refer to sectors [0030]–[0032] and FIGS. 9 and 10).

SUMMARY OF THE INVENTION

Meanwhile, in the optical apparatus stated above, cooling for the liquid crystal panels and entrance/exit-side polarizer plates is based on forced convection, and hence, a large airflow is required in order to attain a satisfactory cooling effect (especially in products of high brightness).

For this reason, a large-sized fan can be rotated at high speed, and there has been the problem that the requisites of reducing a size and lowering noise, in recent years cannot be met. Besides, it is implemented to enlarge a heat capacity by joining liquid-crystal display devices and the entrance/exit-side polarizer plates. In this case, on account of a structure where generated heat transfers between the liquid-crystal display devices and the entrance/exit-side polarizer plates and is radiated to the interior of an armoring case, there has been the problem that a heat radiation efficiency lowers.

An aspect of the invention has been made in order to solve such technical problems, and it is an object to provide an optical apparatus which can meet the requisites of reducing a size and lowering noise, in recent years and which can heighten a heat radiation efficiency, and a projector which comprises the optical apparatus.

A projector according to an exemplary embodiment of the invention can include an illuminating optical system which emits illumination light, a color separating optical system which separates the illumination light emitted from the illuminating optical system, into a plurality of colored lights, a plurality of liquid-crystal display devices which modulate the colored lights separated by the color separating optical system, respectively, so as to form images, and a color synthesizing optical device which synthesizes the images modulated by the plurality of liquid-crystal display devices. The projector can further include a plurality of entrance-side polarizer plates which are arranged on light entrance sides of said plurality of liquid-crystal display devices, a plurality of exit-side polarizer plates which are arranged on light exit sides of the plurality of liquid-crystal display devices, a plurality of entrance-side heat conduction plates which are arranged on light entrance side faces of the color synthesizing optical device, and on which said plurality of exit-side polarizer plates are stuck, respectively, and a first heat conduction member which is joined with the entrance-side heat conduction plate where the exit-side polarizer plate generating a largest quantity of heat among said plurality of exit-side polarizer plates is arranged. The entrance-side heat conduction plate joined to said first heat conduction member can be thermally insulated from the other entrance-side heat conduction plates. The heat of said exit-side polarizer plate generating the largest quantity of heat can be radiated through said first heat conduction member.

Therefore, according to an exemplary projector of the invention, heat generated in the exit-side polarizer plate which is arranged on the light exit side of each liquid-crystal display device is conducted to the corresponding entrance-side heat conduction plate and is radiated through the corresponding entrance-side heat conduction plate. Moreover, the entrance-side heat conduction plate on which the exit-side polarizer plate generating the largest quantity of heat is arranged is thermally insulated from the entrance-side heat conduction plates on which the other exit-side polarizer plates are respectively arranged, so that the heat generated in the exit-side polarizer plate generating the largest quantity of heat can be radiated independently of the exit-side polarizer plate. Further, the first heat conduction member is joined to the entrance-side heat conduction plate on which the exit-side polarizer plate generating the largest quantity of heat is arranged, so that the first heat conduction member can be connected to another arbitrary member of low temperature.

As a result, the efficiency of heat radiation from the exit-side polarizer plate which is located in the optical path of the colored light generating the largest quantity of heat can be made the highest, and a heat radiation efficiency can be effectively heightened as a whole. Thus, a satisfactory cooling effect can be attained by rotating a small-sized fan at low speed, and the requisites of reducing a size and lowering noise, in recent years can be met.

Incidentally, the colored light generating the largest quantity of heat becomes green usually in case of a high-pressure mercury lamp, a metal halide lamp or the like, but it does not always become green, depending upon the sort of a lamp. Even in this case, the entrance-side heat conduction plate located in the optical path of the colored light generating the largest quantity of heat in accordance with the sort of the lamp is arranged in heat insulation from the other entrance-side heat conduction plates, whereby the heat radiation efficiency can be heightened as a whole.

In the exemplary projector as defined above, it can be favorable that a projection-side heat conduction plate is arranged on a light exit side face of said color synthesizing optical device, and that the entrance-side heat conduction plate on which the exit-side polarizer plate generating, at most, a second-largest quantity of heat among said plurality of exit-side polarizer plates is arranged is joined to said projection-side heat conduction plate. Owing such a configuration, heat generated from the entrance-side heat conduction plate which is located in the optical path of the colored light generating, at most, the second-largest quantity of heat among the plurality of entrance-side heat conduction plates is also conducted to the projection-side heat conduction plate, and the temperature rise of the entrance-side heat conduction plate is suppressed.

In the exemplary projector as defined above, it is favorable that the entrance-side heat conduction plate on which said exit-side polarizer plate generating the largest quantity of heat among said plurality of exit-side polarizer plates is arranged is configured so as to be cooled by natural convection or forced convection, and that the entrance-side heat conduction plate on which the exit-side polarizer plate generating, at most, the second-largest quantity of heat is arranged is configured so as to be cooled by forced convection. Owing to such a configuration, the entrance-side heat conduction plate on which the exit-side polarizer plate generating the largest quantity of heat (for example, the exit-side polarizer plate located in the optical path of green) among the plurality of entrance-side heat conduction plates is arranged can be cooled by heat radiation from the joined destination of the first heat conduction member, and it is cooled by receiving air based on the forced convection, while the other entrance-side heat conduction plates are cooled by receiving air based on the forced convection. Therefore, according to the exemplary optical apparatus of the invention, the heat radiation efficiency as a whole can be heightened still more.

In the exemplary projector as defined above, it can be favorable to further include first and second housings for optical components, which accommodate, at least, said illuminating optical system and said color separating optical system, and a second heat conduction member which is connected to said plurality of liquid-crystal display devices. The first housing for optical components, and the second housing for optical components are thermally insulated from each other, and said plurality of liquid-crystal display devices are joined to said first housing for optical components, through said second heat conduction member. Owing to such a configuration, heat generated in each of the liquid-crystal display devices is radiated through the first housing for optical components.

In the projector as defined above, it can be favorable to include panel-side heat conduction plates on which said entrance-side polarizer plate are stuck. The entrance-side polarizer plates are joined to the second housing for optical components, through said panel-side heat conduction plates. Owing to such a configuration, heat generated in each of the entrance-side polarizer plates is conducted to the second housing for optical components, through the corresponding panel-side heat conduction plate and is radiated from the second housing for optical components. hence, the exit-side polarizer plate generating the largest quantity of heat can be cooled more efficiently.

Therefore, the exemplary projector of the invention can attain a satisfactory cooling effect by rotating a small-sized fan at low speed, so that it becomes a projector which can meet the requisites of reducing a size and lowering noise, in recent years.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
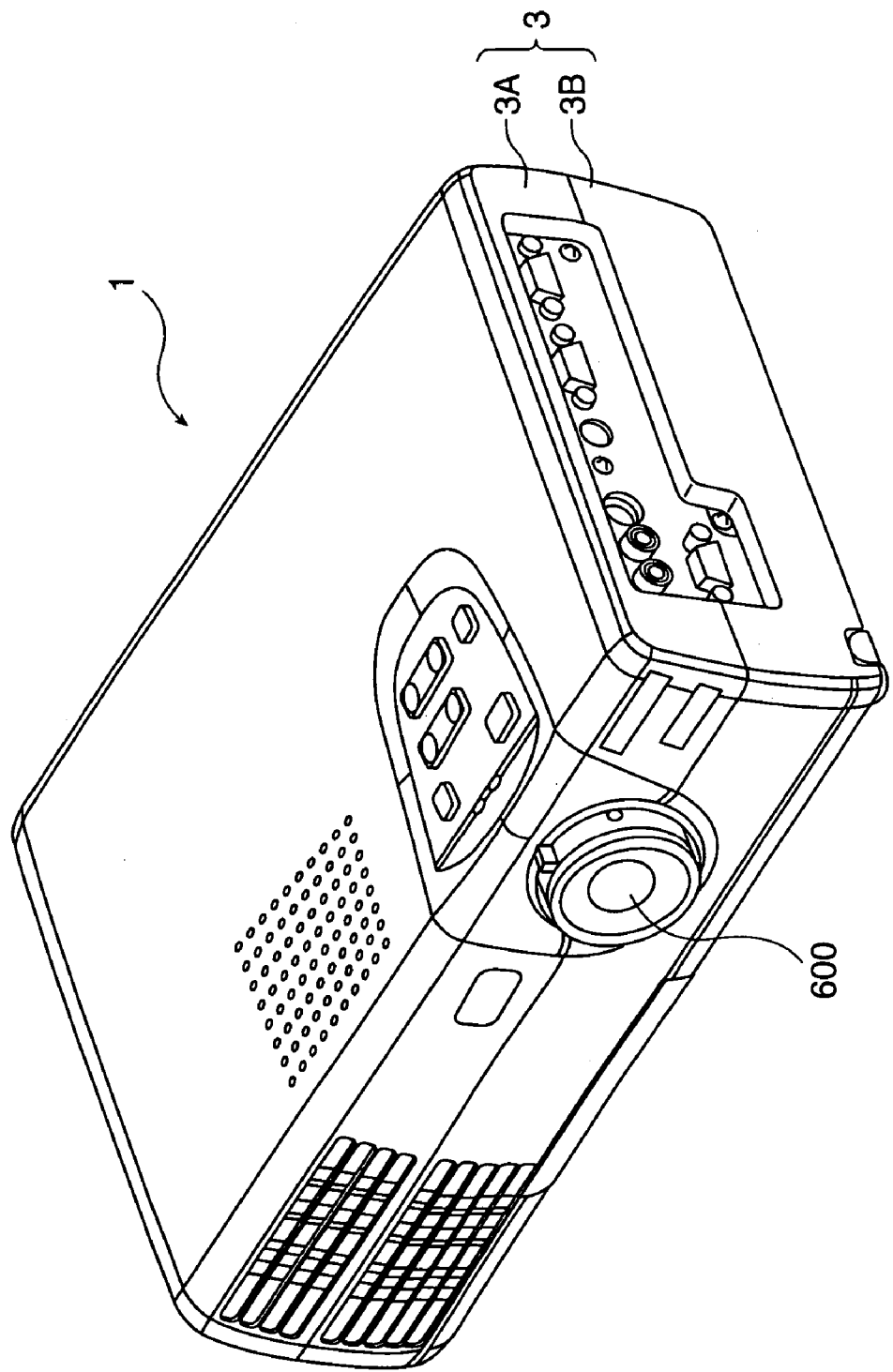
FIG. 1 is a perspective view showing the external appearance of a projector according to an embodiment.

Now, a projector to which the invention is applied will be described in conjunction with aspects of performance shown in the drawings.

Figure 2:
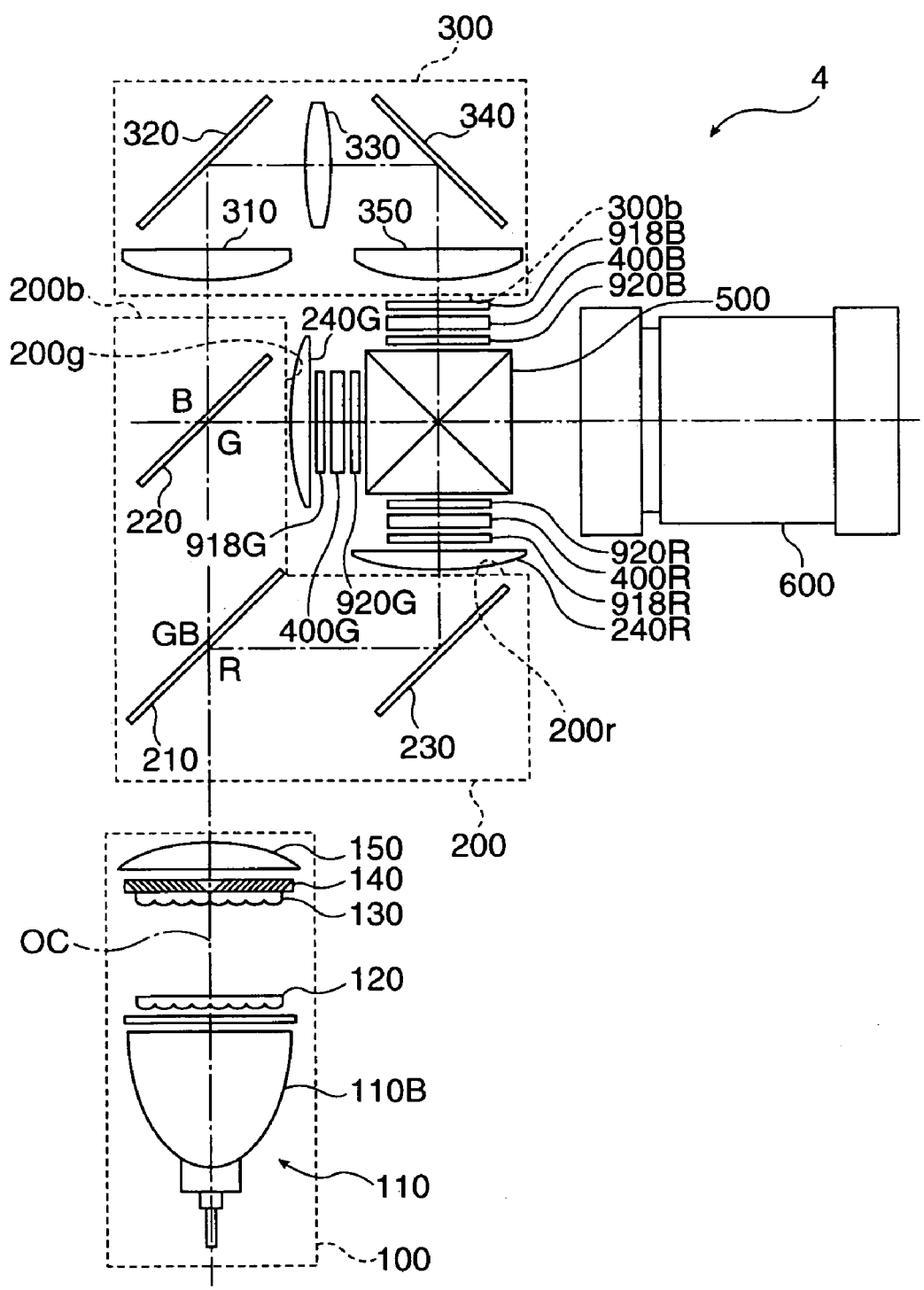
FIG. 2 is a plan view shown for explaining the schematic configuration of an optical system.
Figure 3:
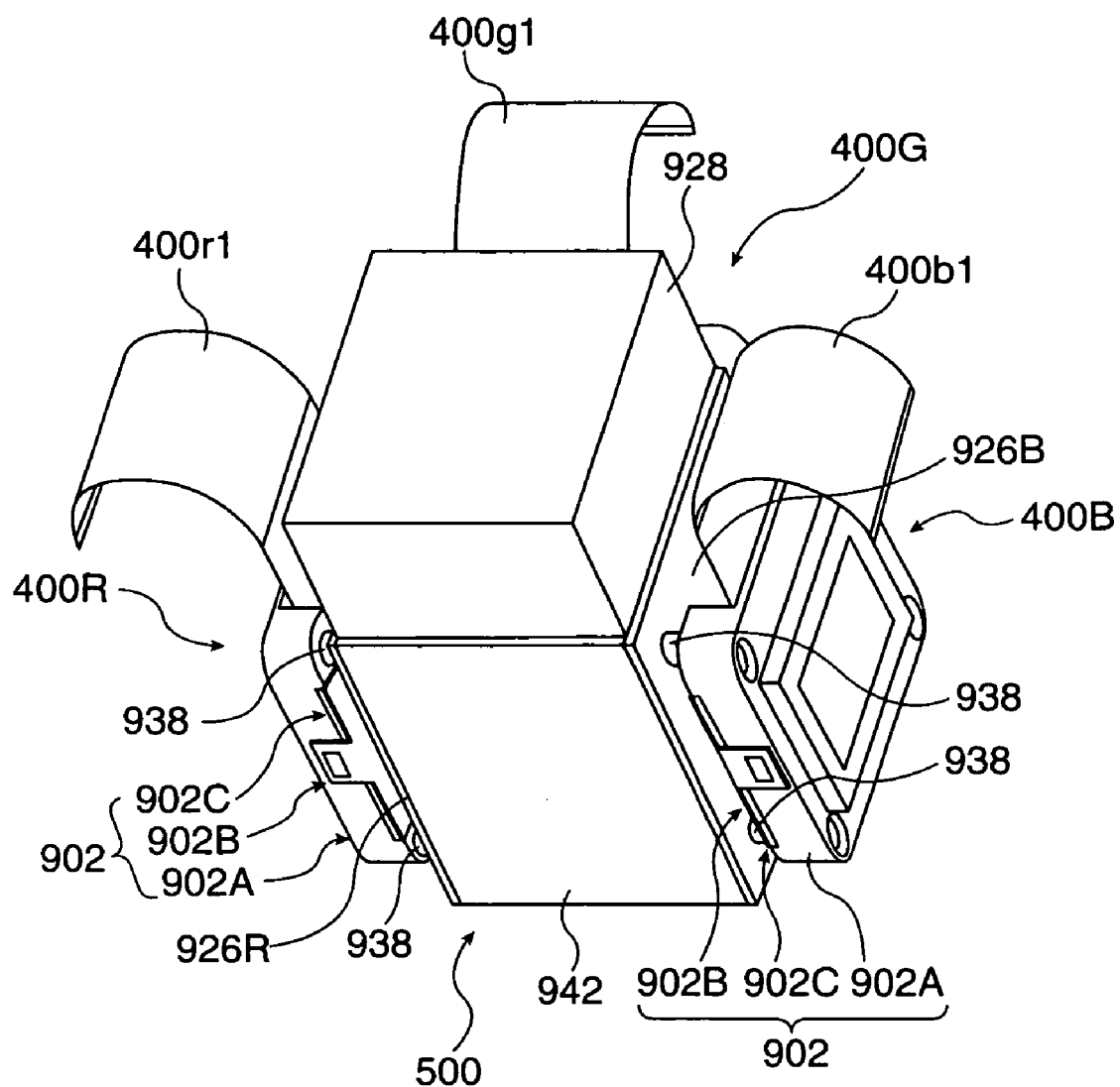
FIG. 3 is a perspective view showing the optical apparatus of the projector according to the embodiment.
Figure 4:
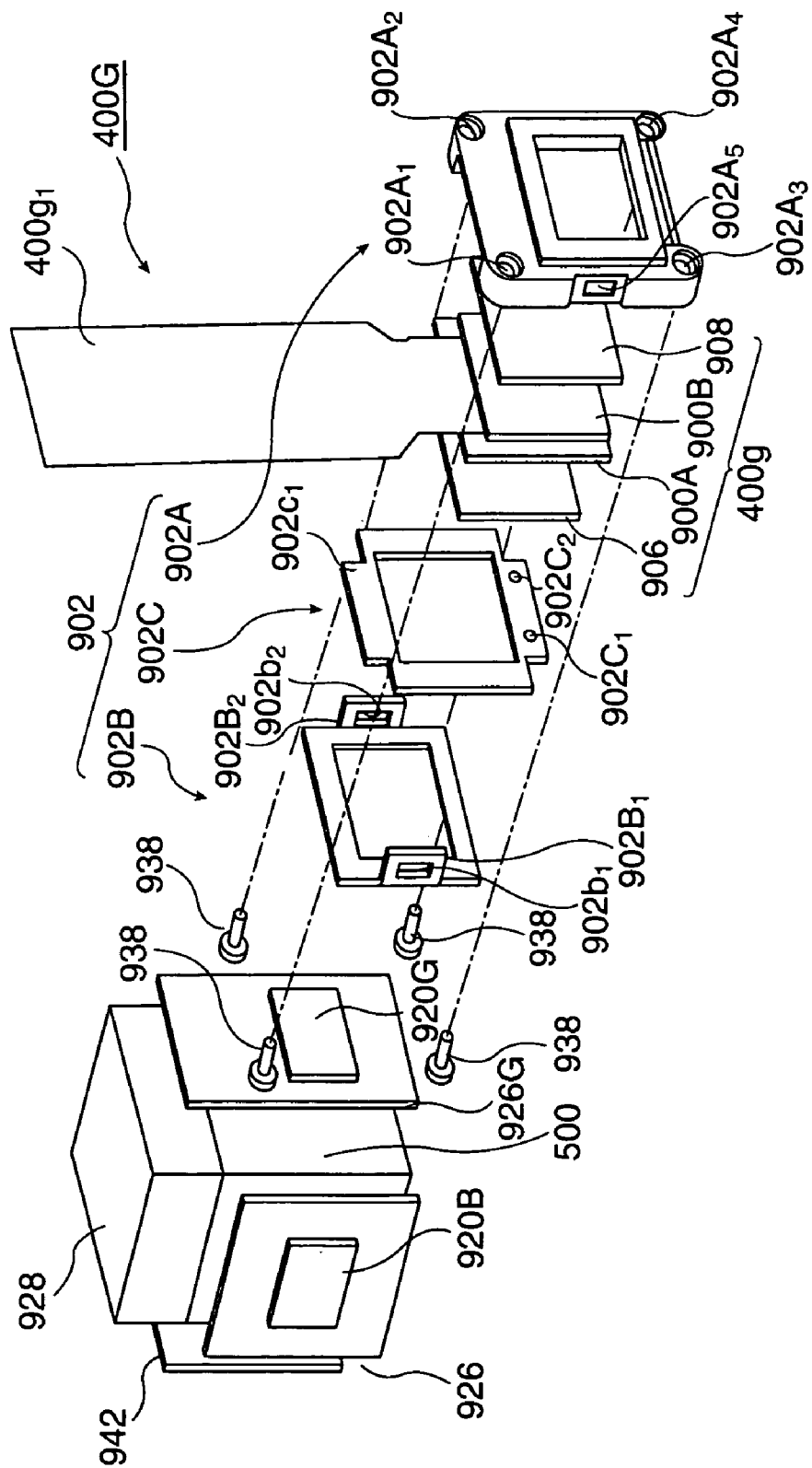
FIG. 4 is an exploded perspective view showing the optical apparatus of the projector according to the embodiment.

FIG. 1 is a perspective view showing the external appearance of a projector according to an embodiment of the present invention. FIG. 2 is a plan view shown for explaining the schematic configuration of an optical system in the projector in FIG. 1. FIG. 3 is a perspective view showing the optical apparatus of the projector according to the embodiment of the present invention. FIG. 4 is a perspective view showing the optical apparatus of the projector according to the embodiment of the present invention, in exploded fashion. FIGS. 5(a)–(c) are a plan view, a front view and a bottom view showing the essential portions of the optical apparatus of the projector according to the embodiment of the present invention.

Referring to FIG. 1, a projector designated by reference numeral 1 includes an optical system 4 (shown in FIG. 2) which has a projection lens 600 that is protuberant frontward of an apparatus. The optical system 4 except the projection lens 600 is built in an armoring case 3. The armoring case 3 is formed of a substantially square box member which is formed of an upper case 3A and a lower case 3B.

As shown in FIG. 2, the optical system 4 is schematically configured of the projection lens 600, and besides, an illuminating optical system 100, a color separating optical system 200, a relay optical system 300, three liquid-crystal display devices 400R, 400G, 400B, and a color synthesizing optical system 500. The constituents of the individual optical systems are arranged substantially in horizontal directions around the color synthesizing optical system 500.

The illuminating optical system 100 can include a light source device 110, a first lens array 120, a second lens array 130, a polarization transducer 140, and a superposition lens 150.

The light source device 110 has a light source lamp (not shown), and a reflector 10B. A high-pressure mercury lamp, for example, is employed as the light source lamp. A parabolic mirror is employed as the reflector 110B. Thus, radiated light having exited from the light source lamp is reflected unidirectionally by the reflector 110B, into light which is substantially parallel to an optical axis OC, and which is entered into the first lens array 120. Another light source lamp, such as metal halide lamp or halogen lamp, may well be employed as the light source lamp.

Besides, an elliptical mirror or a spherical mirror may well be employed as the reflector 10B. In this case, a lens or the like should preferably be arranged between the light source device 110 and the first lens array 120 in order that the light emitted from the light source device 110 may efficiently enter the first lens array 120.

The first lens array 120 can be formed by arraying a plurality of small lenses in the shape of a matrix. Herein, it is configured so as to divide the light from the light source device 110 into a plurality of partial light beams, and to focus the individual partial light beams.

The second lens array 130 has a plurality of small lenses which are arrayed so as to correspond to the small lenses of the first lens array 120. Herein, it is so configured that the center axes of the individual partial light beams having exited from the first lens array 120 are uniformalized to be parallel to the system optical axis.

The polarization transducer 140 is configured so as to uniformalize non-polarized lights into polarized lights having polarization directions as can be utilized by the three liquid-crystal display devices 400R, 400G, 400B.

The superposition lens 150 is so configured that the lights emergent from the second lens array 130 (and the polarization transducer 140) are superposed on predetermined regions to-be-illuminated (the image forming regions of the liquid-crystal display devices 400R, 400G, 400B). Therefore, the superposition lens can illuminate the image forming regions of the liquid-crystal display devices 400R, 400G, 400B (liquid crystal panels) substantially uniformly in cooperation with the functions of the first lens array 120 and the second lens array 130.

The color separating optical system 200 has a first dichronic mirror 210, a second dichroic mirror 220, and a reflection mirror 230. Herein, it is so configured that the illumination light exiting from the illuminating optical system 100 is separated into illumination lights in three colors of respectively different wavelength regions.

The first dichroic mirror 210 is so configured that substantially red light (R light) is reflected at right angles to proceed toward the reflection mirror 230, and that substantially blue light (B light) and substantially green light (G light) are transmitted therethrough to proceed toward the second dichroic mirror 220.

The second dichroic mirror 220 is so configured that the G light is reflected at right angles to exit from an exit portion 200g toward the color synthesizing optical system 500, and that the B light is transmitted therethrough to exit from an exit portion 200b toward the relay optical system 300.

The reflection mirror 230 is so configured that the R light is reflected at right angles to exit from an exit portion 200r toward the color synthesizing optical system 500.

Field lenses 240R and 240G are respectively arranged on the exit sides (liquid-crystal display device sides) of the exit portion 200r of the R light and the exit portion 200g of the G light in the color separating optical system 200. Thus, the R light, G light having exited from the respective exit portions 200r, 200g illuminate the liquid crystal panels of the liquid-crystal display devices 400R, 400G. Usually, the optical system 4 is so set that the individual partial light beams from the illuminating optical system 100 become substantially parallel light beams.

The relay optical system 300 has an entrance-side lens 310, an entrance-side reflection mirror 320, a relay lens 330, an exit-side reflection mirror 340, and a field lens 350. Herein, it is so configured that the B light having exited from the exit portion 200b in the color separating optical system 200 is transmitted through the lenses 310, 330, 350 (reflected from the reflection mirrors 320, 340), to exit from the exit portion 300b of the B light in this relay optical system 300 toward the color synthesizing optical system 500. Thus, the B light having exited from the exit portion 300b illuminates the liquid crystal panel of the liquid-crystal display device 400B. In this way, the light quantity loss of the B light whose optical path length is the maximum is suppressed.

The size of a light beam which enters the field lens 350 is set so as to become substantially equal to the size of a light beam which enters the entrance-side lens 310.

Incidentally, this embodiment has been described concerning the case where the illumination light of the color passing through the relay optical system 300 is the B light, but the illumination light may well be the other colored light, such as red light, instead of the B light.

The liquid-crystal display devices 400R, 400G, 400B are formed of three liquid-crystal display devices of, for example, transmission type, and they are arranged on the entrance sides of the color synthesizing optical system 500 in correspondence with the colored lights of RGB. Herein, they are configured so as to modulate the colored lights having exited from the color separating optical system 200 (from the relay optical system 300 in case of the B light), and to add image information items corresponding to the respective colored lights. More specifically, the liquid-crystal display devices 400R, 400G, 400B (liquid crystal panels to be explained later) are subjected to switching controls conforming to the image information, by drivers (not shown). Thus, the colored lights which pass through the respective liquid-crystal display devices 400R, 400G, 400B are modulated.

Since the liquid-crystal display devices 400R, 400G, 400B have substantially the same configurations, the configurations of the liquid-crystal display devices 400R, 400B shall be omitted from description, and only the configuration of the liquid-crystal display device 400G will be described. The liquid-crystal display device 400G is schematically configured of a liquid crystal panel 400g and a metal frame 902 as shown in FIG. 4. Besides, it is arranged on the light entrance side of the color synthesizing optical system 500 as shown in FIG. 3.

Incidentally, individual members which constitute the liquid-crystal display device 400G are similarly included in the liquid-crystal display devices 400R, 400B, and constituents, such as a polarizer, which are arranged on the entrance side and exit side of the liquid-crystal display device 400G are similarly arranged on the entrance sides and exit sides of the liquid-crystal display devices 400R, 400B, so that the constituents will be described by assigning identical or equivalent signs (with the differences of R, G, B).

The liquid crystal panel 400g can include two glass substrates (a TFT substrate 900A and a counter substrate 900B) which oppose to each other through a liquid crystal layer (not shown), and it is accommodated and held in the metal frame 902, and is connected to a wiring flexible circuit board $400g_1$.

The glass substrate 900A has a large number of pixel electrodes which are regularly arrayed on the liquid-crystal layer side thereof, and switching elements which are constructed of thin film transistors (TFTs) for applying voltages correspondent to image signals to the pixel electrodes (neither the pixel electrodes nor the TFTs are shown), and it has a flat rectangular shape as a whole. A dust-proof cover 906 made of transparent glass is stuck on the exit side of the glass substrate 900A.

As shown in FIG. 4, the area of the plane of the dust-proof cover 906 is set at a size which is smaller than the area of the plane of the glass substrate 900A. Besides, the exit side surface of the dust-proof cover 906 is located so as to be flush with the exit side surfaces of the second frame member and third frame member (both will be explained below) of the metal frame 902. Thus, the dust-proof cover 906 becomes easy of receiving cooling air based on forced convection, and thermal radiation from the exit side surface thereof is effectively performed.

The glass substrate 900B has counterelectrodes (not shown) which oppose to the pixel electrodes of the glass substrate 900A, and the whole glass substrate has a flat rectangular shape which has an area somewhat smaller than that of the glass substrate 900A (an area substantially equal to that of the plane of the dust-proof cover 906). A dust-proof cover 908 made of transparent glass is stuck on the entrance side of the glass substrate 900B. The area of the plane of the dust-proof cover 908 is set at a size which is substantially equal to the area of the plane of the glass substrate 900B.

The metal frame 902 being the frame member of the liquid-crystal display device 400 has the first frame member (entrance-side frame member) 902A, the second frame member (exit-side frame member) 902B and a third frame member (exit-side frame member) 902C, and it is configured so as to accommodate and hold the liquid crystal panel 400g therein. An entrance-side polarizer plate 918G (shown in FIG. 2) is arranged on the entrance side of the metal frame 902, while an exit-side polarizer plate 920G (shown in FIG. 2) is arranged on the exit thereof.

Figure 5:
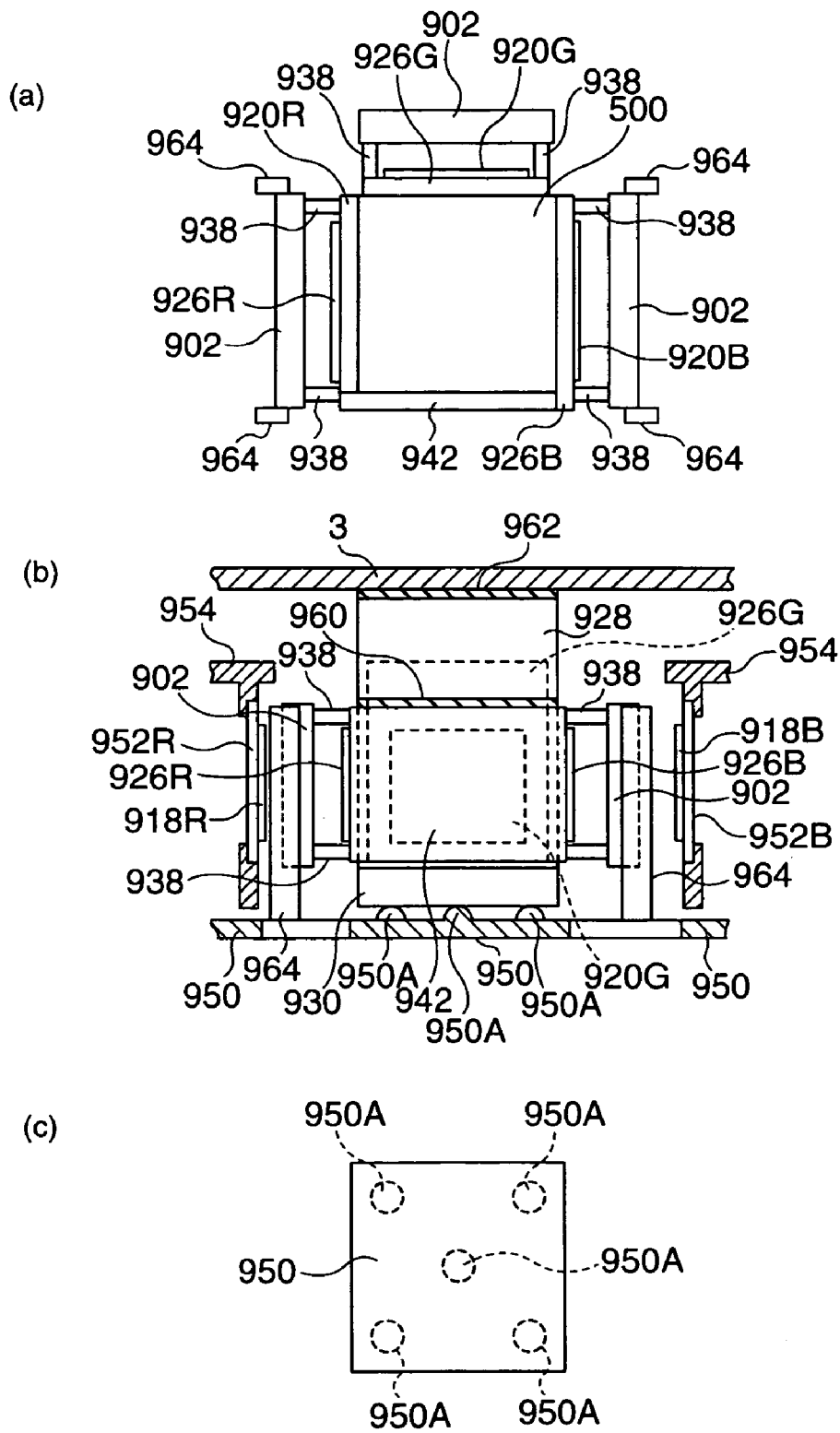
FIGS. 5(a)–(c) are a plan view, a front view and a bottom view showing the essential portions of the optical apparatus of the projector.
Figure 6:
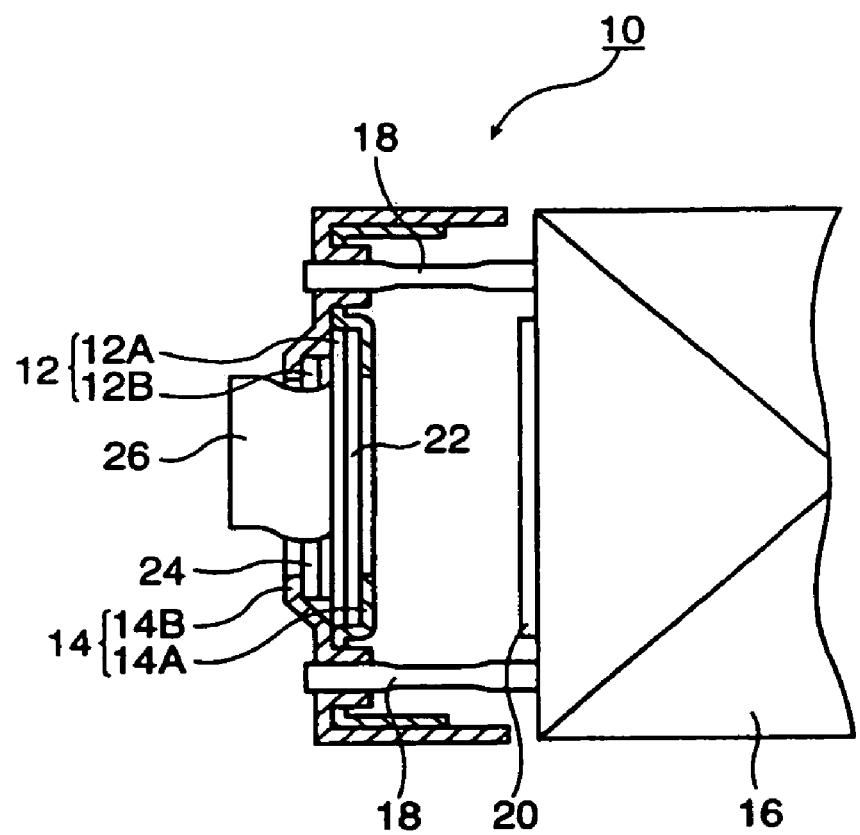
FIG. 6 is a sectional view showing the conventional optical apparatus.

The first frame member 902A has an exit-side space portion (not shown) capable of accommodating the glass substrates 900A, 900B and the dust-proof cover 908 therein, and it is formed of a stepped frame of substantially square shape as a whole. A lower end edge in the first frame member 902A is integrally provided with two engagement pins (not shown) which protrude onto the exit side (the side of the color synthesizing optical system), and which are juxtaposed to each other in a lateral direction. Besides, as shown in FIGS. 5(a) and (b), the metal frame 902 being the frame member of the liquid-crystal display device 400 is joined to a first housing for optical components 950 (shown in FIG. 5) through a second heat conduction member 964. Thus, heat generated in each of the liquid-crystal display devices 400R, 400G, 400B is conducted to the first housing for optical components 950 through the second heat conduction member 964, and it is radiated from the first housing for optical components 950 into the armoring case 3.

As shown in FIG. 4, the corners of the first frame member 902A are provided with pin insertion holes $902A_1$ to $902A_4$ which are open in the arrayed direction of the glass substrates 900A, 900B (in the thickness direction of the first frame member). Heat insulating pins 938 are inserted through the pin insertion holes $902A_1$ to $902A_4$, and are fixed. Both the side parts of the first frame member 902A are provided with engagement protuberances $902A_5$, $902A_6$ which protrude in a horizontal direction (only one engagement protuberance $902A_5$ is shown).

The second frame member 902B is detachably attached to the exit side of the first frame member 902A, and it is configured so as to hold the third frame member 902C in pressed touch with the first frame member 902A. Both the side parts of the second frame member 902B are provided with elastically deformable hooks $902B_1$, $902B_2$ which have engagement holes $902b_1$, $902b_2$ that are engageable with the engagement protuberances $902A_5$, $902A_6$ of the first frame member 902A. As shown in FIG. 4, a heat conduction plate 926G on which the exit-side polarizer plate 920G is stuck is arranged on the exit side of the second frame member 902B.

The third frame member (intermediate frame) 902C is arranged around the dust-proof cover 906, and it is interposed between the exit side face of the first frame member 902A and the entrance side face of the second frame member 902B. As shown in FIG. 4, the third frame member 902C is provided with pin engagement holes $902C_1$, $902C_2$ which are respectively engageable with the engagement pins of the first frame member 902A.

The entrance side of the third frame member 902C is provided with a receiving surface $902c_1$ which abuts on the exit side surface of the glass substrate 900A. As stated before, therefore, the area of the plane of the dust-proof cover 906 is set at the size which is smaller than the area of the plane of the glass substrate 900A. In this case, the contact area between the receiving surface $902c_1$ of the third frame member 902C and the entrance side surface of the glass substrate 900A can be made a size which is obtained by subtracting the area of the plane of the dust-proof cover 906 from the area of the plane of the glass substrate 900A. Thus, the receiving surface $902c_1$ of the third frame member 902C and the exit side surface of the glass substrate 900A come into plane contact.

The entrance-side polarizer plate 918G is joined to a second housing for optical components 954 through a panel-side heat conduction plate 952G (not shown). As shown in FIG. 5(b), the entrance-side polarizer plates 918R, 918B are respectively joined to the second housing for optical components 954 through panel-side heat conduction plates 952R, 952B. Thus, heat ascribable to the colored light as absorbed by each of the entrance-side polarizer plates 918R, 918G, 918B is conducted to the second housing for optical components 954 through the corresponding one of the panel-side heat conduction plates 952R, 952G, 952B, and it is radiated from the second housing for optical components 954 into the armoring case 3.

Exit-side polarizer plates 920R, 920G, 920B are respectively stuck on the light entrance side faces of the color synthesizing optical system 500 through entrance-side heat conduction plates 926R, 926G, 926B.

Among the entrance-side heat conduction plates 926R, 926G, 926B, the two heat conduction plates 926R, 926B corresponding to optical paths for the R, B colors are formed of rectangular plates whose planes have substantially equal areas, and they are joined to each other by a projection-side heat conduction plate 942. Thus, generated heat can be conducted between the entrance-side heat conduction plates 926R, 926B and the projection-side heat conduction plate 942, and the temperature rises of the heat conduction plates 926R, 926B and projection-side heat conduction plate 942 are suppressed. Heat insulating pins 938 which protrude onto the panel sides are mounted on the light entrance side faces of the entrance-side heat conduction plates 926R, 926B.

On the other hand, the entrance-side heat conduction plate 926G corresponding to an optical path for the G color is formed of a vertically-long rectangular plate (of small lateral dimension and large vertical dimension) whose plane has an area different from the area of the plane of each of the other heat conduction plates 926R, 926B. Herein, it is arranged in heat insulation from the other entrance-side heat conduction plates 926R, 926B, and it is joined to the armoring case 3 through heat conduction rubbers 960, 962 being first heat conduction members, as well as a heat conduction block 928. Thus, when heat absorbed by the polarizer plate 920G is conducted to the heat conduction plate 926G, it is conducted from the heat conduction plate 926G to the armoring case 3 through the heat conduction rubbers 960, 962 and the heat conduction block 928, and it is radiated out of the armoring case 3. As shown in FIG. 4, heat insulating pins 938 which protrude onto the panel side are mounted on the light entrance face of the entrance-side heat conduction plate 926G.

The heat insulating pins 938 are formed of four stepped (flanged) pins. The metal frames 902 which oppose to the entrance-side heat conduction plates 926R, 926G, 926B with predetermined spacings therefrom, are fixed at the intermediate parts of the heat insulating pins 938. Thus, the entrance-side heat conduction plates 926R, 926G, 926B and the metal frames 902 are joined by the heat insulating pins 938. Therefore, heat does not transfer between liquid crystal panels 400r, 400g, 400b and the entrance-side heat conduction plates 926R, 926G, 926B.

The color synthesizing optical system 500 is made of a color synthesizing optical device, such as dichroic prism (color synthesizing prism), and it is arranged on the exit sides of the respective liquid-crystal display devices 400R, 400G, 400B in connection with the heat conduction block 928. Herein, it is so configured that the color lights (images) modulated by the liquid-crystal display devices 400R, 400G, 400B can be entered thereinto and synthesized. Besides, the color synthesizing optical system 500 is arranged on the first housing for optical components 950 through a color-synthesizing-prism fixation plate 930.

The color-synthesizing-prism fixation plate 930 is formed of a heat insulating member. Thus, the color synthesizing optical system 500 and the liquid-crystal display devices 400R, 400G, 400B are thermally insulated from each other. As shown in FIGS. 5(*b*) and (*c*), the color-synthesizing-prism fixation plate 930 is arranged on the first housing for optical components 950 through semispherical bulges 950A, and it is configured so as to lie in point contact with the five of the bulges 950A, for example, on the first housing for optical components, 950. Thus, the heat insulation effect between the color synthesizing optical system 500 and the liquid-crystal display devices 400R, 400G, 400B is enhanced still more.

The projection lens 600 can be arranged on the exit side of the color synthesizing optical system 500. Herein, it is so configured that an image synthesized by the color synthesizing optical system 500 is enlarged and displayed as a projection image on a screen (not shown) which forms a projection plane.

Owing to the above configuration, in the projector according to the exemplary embodiment, the generated heat (absorbed heat) in the entrance-side polarizer plate 918G located in the optical path for green is conducted to the panel-side heat conduction plate 952G (not shown) and is radiated from this heat conduction plate 952G into the armoring case 3.

Besides, the generated heat in the exit-side polarizer plate 920G located in the optical path for green is radiated into and out of the armoring case 3. More specifically, the generated heat from the exit-side polarizer plate 920G is conducted to the entrance-side heat conduction plate 926G and is radiated from this heat conduction plate 926G into the armoring case 3, while at the same time, it is conducted to the armoring case 3 through the heat conduction rubbers 960, 962 as well as the heat conduction block 928 and is radiated out of this armoring case 3 (into the atmosphere).

On the other hand, the generated heat in each of the entrance-side polarizer plates 918R, 918B located in the optical paths other than the optical path for green (the optical paths corresponding to the optical paths for the R and B colors) is conducted to the corresponding one of the panel-side heat conduction plates 952R, 952B, and it is radiated from the corresponding heat conduction plate 952R or 952B into the armoring case 3.

Besides, the generated heat in each of the exit-side polarizer plates 920R, 920B located in the optical paths corresponding to the optical paths for the R, B colors is conducted to the corresponding one of the entrance-side heat conduction plates 926R, 926B, and it is radiated from the corresponding heat conduction plate 926R or 926B into the armoring case 3.

In addition, the generated heat in each of the liquid crystal panels 400r, 400g, 400b is radiated into the armoring case 3 through the metal frame 902.

Accordingly, the generated heat in the liquid crystal panels 400r, 400g, 400b, the entrance-side polarizer plates 918R, 918G, 918B and the exit-side polarizer plates 920R, 920G, 920B can be dispersedly transferred into and out of the armoring case 3, so that cooling based on forced convection, or cooling based on natural convection can be performed for the liquid crystal panels 400r, 400g, 400b, the entrance-side polarizer plates 918R, 918G, 918B and the exit-side polarizer plates 920R, 920G, 920B.

Thus, a satisfactory cooling effect can be attained by rotating a small-sized fan at low speed, and the requisites of reducing a size and lowering noise, in recent years can be met.

The invention claimed is:

1. A projector, including:
    an illuminating optical system that emits illumination light;
    a color separating optical system that separates the illumination light emitted from the illuminating optical system, into a plurality of colored lights;
    a plurality of liquid-crystal display devices that modulate the colored lights separated by the color separating optical system, respectively, so as to form images; and
    a color synthesizing optical device that synthesizes the images modulated by the plurality of liquid-crystal display devices;
    the projector further comprising:
    a plurality of entrance-side polarizer plates that are disposed on light entrance sides of said plurality of liquid-crystal display devices;
    a plurality of exit-side polarizer plates that are disposed on light exit sides of said plurality of liquid-crystal display devices;
    a plurality of entrance-side heat conduction plates that are disposed on light entrance side faces of said color synthesizing optical device, and on which said plurality of exit-side polarizer plates are disposed, respectively; and
    a first heat conduction member that is joined with the entrance-side heat conduction plate where the exit-side polarizer plate generating a largest quantity of heat among said plurality of exit-side polarizer plates is disposed;
    said entrance-side heat conduction plate joined to said first heat conduction member being thermally insulated from other entrance-side heat conduction plates; and
    heat of said exit-side polarizer plate generating the largest quantity of heat being radiated through said first heat conduction member.

2. The projector as defined in claim 1, a projection-side heat conduction plate being disposed on a light exit side face of said color synthesizing optical device, and the entrance-side heat conduction plate on which the exit-side polarizer plate generating, at most, a second-largest quantity of heat among said plurality of exit-side polarizer plates is disposed being joined to said projection-side heat conduction plate.

3. The projector as defined in claim 1, said entrance-side heat conduction plate on which said exit-side polarizer plate generating the largest quantity of heat among said plurality of exit-side polarizer plates is disposed being configured so as to be cooled by at least one of natural convection and forced convection, and the entrance-side heat conduction plate on which the exit-side polarizer plate generating, at most, a second-largest quantity of heat is disposed being configured so as to be cooled by forced convection.

4. The projector as defined in claim 1, the projector further comprising:
   first and second housings for optical components, that accommodate, at least, said illuminating optical system and said color separating optical system; and
   a second heat conduction member that is coupled to said plurality of liquid-crystal display devices;
   the first housing for optical components, and the second housing for optical components being thermally insulated from each other; and
   said plurality of liquid-crystal display devices being joined to said first housing for optical components, through said second heat conduction member.

5. The projector as defined in claim 4, the projector further comprising:
   panel-side heat conduction plates on which said entrance-side polarizer plate are disposed;
   said entrance-side polarizer plates being joined to the second housing for optical components, through said panel-side heat conduction plates.

6. The projector as defined in claim 4, said color synthesizing optical device being disposed on either of said first and second housings for optical components, in heat insulation therefrom.

7. The projector as defined in claim 1, said projector further comprising an armoring case which accommodates, at least, optical components on an optical path from said illuminating optical system to said color synthesizing optical device;
   said first heat conduction member being joined to said armoring case.

* * * * *